Jan. 29, 1963 K. RÄNTSCH ETAL 3,075,425
MEASURING SCALE
Filed Sept. 29, 1961 3 Sheets-Sheet 1
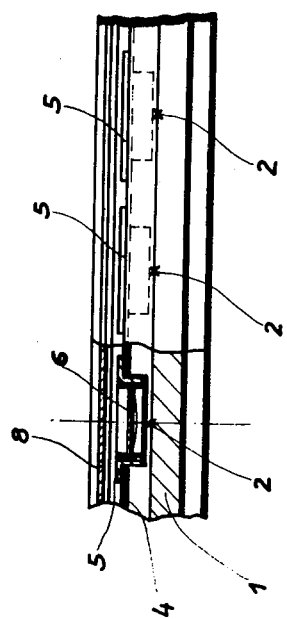
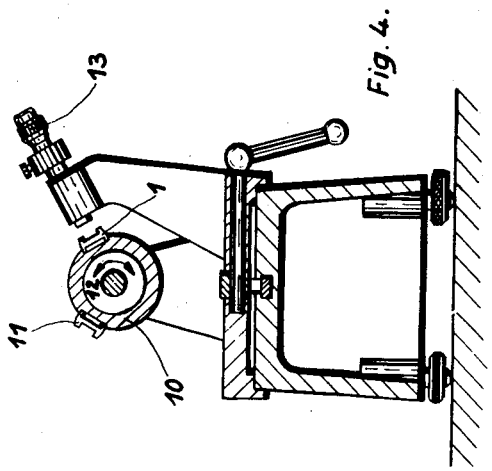
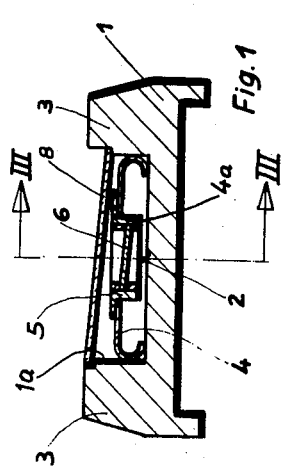
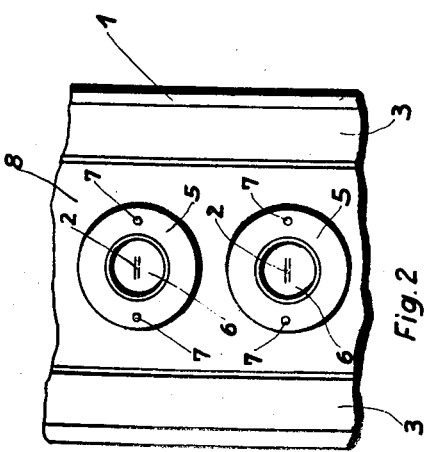
INVENTORS
KURT RÄNTSCH
ENVER KÜHL
BY Toulmin & Toulmin
ATTORNEYS Jan. 29, 1963 K. RÄNTSCH ETAL 3,075,425
MEASURING SCALE
Filed Sept. 29, 1961 3 Sheets-Sheet 2

INVENTORS
KURT RÄNTSCH
ENVER KÜHL
BY Toulmin & Toulmin
ATTORNEYS

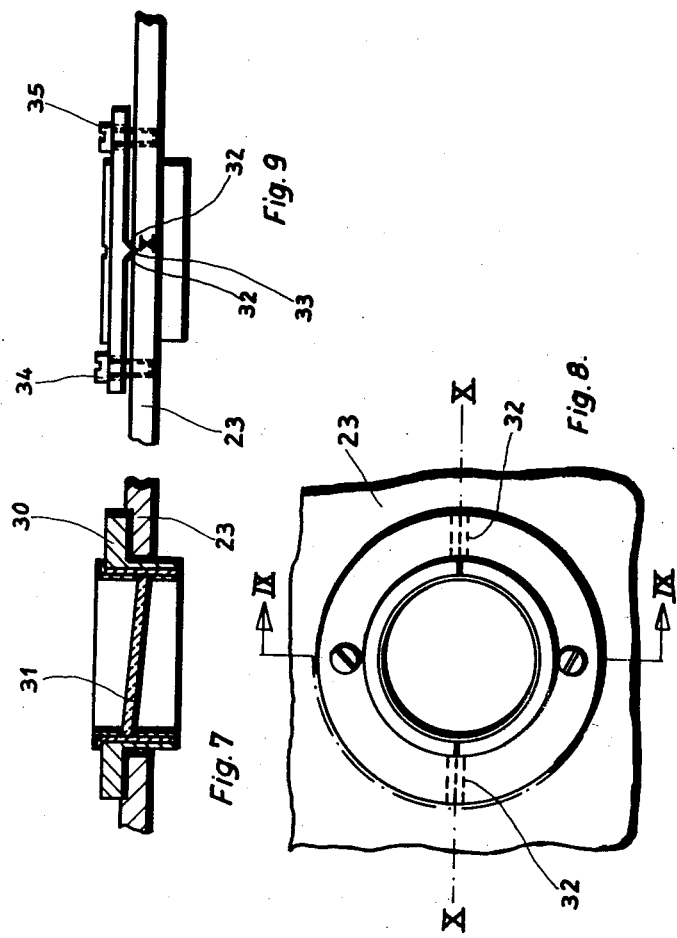

United States Patent Office 3,075,425
Patented Jan. 29, 1963

3,075,425
MEASURING SCALE
Kurt Räntsch and Enver Kühl, Wetzlar (Lahn), Germany, assignors to M. Hensoldt & Söhne Optische Werke Aktiengesellschaft, Wetzlar (Lahn), Germany
Filed Sept. 29, 1961, Ser. No. 141,846
Claims priority, application Germany Oct. 5, 1960
10 Claims. (Cl. 88—1)

The present invention relates to a measuring scale of the type wherein scale or division marks are set in or applied onto a scale surface, more particularly, to a measuring scale of this type wherein the scale marks are always accurately viewed regardless of any inaccuracies which may have been introduced into the location of the marks during the manufacturing process.

In the conventional measuring scale, regularly spaced scale or division marks are applied onto a scale surface usually by painting the marks thereon, by inlays of contrasting colored materials, or by making indentations in the scale surface and applying a contrasting color paint to the indentations. In spite of all the care which is taken to accurately position these scale marks, inaccuracies inevitably creep into the spacing of these marks when the scale is completed. These inaccuracies introduce errors when the scale is used which errors are objectionable, particularly when close tolerance work is being done.

It is therefore the principal object of this invention to provide a novel and improved measuring scale.

It is another object of this invention to provide a measuring scale wherein the scale marks will always be correctly located when viewing the scale.

The objects of the present invention are achieved by providing a particular form of an optical device together with a measuring scale so that the image of the scale marks is always correctly positioned when an operator is viewing the measuring scale. It is therefore not necessary that the scale mark itself be accurately positioned but only that the image of the scale mark be accurately positioned when the scale is being used.

The measuring scale of this invention essentially comprises a scale surface having conventional scale marks thereon. An optical element comprising a planar glass plate is positioned above each scale marking in such a manner that the scale plate is inclined at an angle with respect to the scale surface. In addition, the glass plate is so mounted that it is rotatable about an axis which is perpendicular to the scale surface.

When the glass plate is rotated, the scale mark which is below the glass plate is optically displaced. The degree of this displacement is determined by the degree of rotation of the glass plate and can be done in such a manner that the image of the scale mark will appear in the correct and accurate position.

The invention comprises an elongated scale body which has either an X- or H-cross-section so as to provide a longitudinally extending groove on a face thereof. A supporting frame is positioned in the groove between the side walls thereof and above the scale marks which are on the bottom surface of the groove. A further glass plate may be positioned above the first glass plate so as to cover the groove and to provide some degree of protection therefor. The second glass plate also prevents dust from accumulating on the scale markings and obscuring the reading thereof. Any inaccuracies in the positioning of the scale marking images due to imperfections in the second glass plate can be compensated for by rotating the inclined glass plates. Since the optical elements of this scale are all below the upper surface of the scale body, the scale of this invention will not occupy any additional space and hence can be readily installed on conventional applications such as machine tools and the like.

This scale can also be used in comparison machines for comparing reading scales with a master scale.

In addition to the use of this scale for linear and circular scales, the scale can also be used for those measuring scales comprised of intersecting grid lines, where the grid lines are at right angles to each other.

Other objects and advantages of this invention will become apparent upon reference to the accompanying description when taken in conjunction with the following drawings, wherein FIGURE 1 is a transverse sectional view taken through a linear scale according to the present invention;

FIGURE 2 is a top plan view of the linear scale of FIGURE 1;

FIGURE 3 is a longitudinal sectional view of a portion of the scale of FIGURE 1 and taken along the line III—III of FIGURE 1;

FIGURE 4 is a vertical transverse sectional view of a scale comparison machine employing the measuring scale of the present invention;

FIGURE 7 is a view similar to that of FIGURE 6 but showing a modification of the optical element;

FIGURE 8 is a top plan view of the modification illustrated in FIGURE 7; and

FIGURE 9 is a sectional view, taken along the line IX—IX of FIGURE 8 and showing in elevation the modification of FIGURE 7.

Returning now to the drawings wherein like reference symbols indicate the same parts throughout the various views, several embodiments of the present invention will be described in detail.

Figure 6:
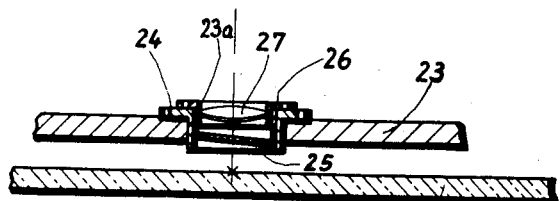
FIGURE 6 is a sectional view taken along the line VI—VI of FIGURE 5.

With particular reference to FIGURES 1 through 3 there is illustrated therein a linear measuring scale according to the present invention. This scale comprises a scale body 1 which has an H-cross-section so that in the upper surface of the scale body there is formed a longitudinally extending groove 1a. Scale or division marks 2 are positioned on the flat bottom surface of the groove 1a along the central axis of the scale body 1. The groove is enclosed by side walls 3.

A supporting frame 4 having resilient arms as may be seen in FIGURE 1 is positioned in the groove between the side walls 3. These arms have sufficient strength so as to securely position the supporting frame in place whereby the frame will remain positioned and is not susceptible to shifting or other movements.

The supporting frame is provided with a plurality of openings 4a each of which is positioned above a scale marking 2. In each opening is rotatably mounted a mounting frame 5 in which is positioned a glass plate 6 which is inclined at an angle with respect to the bottom of the groove or scale surface. The mounting frame 5 is rotatable about an axis which is perpendicular with respect to the scale surface. In order to accurately rotate, each mounting frame 5 is provided with two holes 7 for receiving a suitable instrument.

A cover plate 8 is mounted across the groove 1a and above the supporting frame 4 to close the groove and to protect the optical elements therein. The glass plate 8 is also inclined at an angle with respect to the bottom surface in order to deflect any disturbing light reflections away from the operator's eye who may be viewing the scale.

The measuring scale as described immediately above functions in the following manner:

If it is ascertained that one of the scale marks 2 is inaccurately positioned because of technical manufacturing reasons, then the image of this scale mark can be accurately positioned so as to appear in its correct position when the scale is being used. This is accomplished by rotating the mounting frame 5. The glass plate 6 will then displace the image of the scale markings because of its inclined position in the direction of its greatest inclination. Rotation of the mounting frame 5 will rotate the image of the measuring mark 2 in a circle in such a manner that the image will always remain parallel to the scale mark 2. Thus, this rotation of the mounting frame and the glass plate 6 displaces the image of the scale marking along the direction of the measuring scale. By carefully rotating the mounting frame 6 through a particular angle, the image of the scale marking can be displaced so as to completely compensate for the inaccurate positioning of its corresponding scale marking.

Proceeding next to FIGURE 4 there is illustrated therein a scale comparison machine in which the measuring scale of this invention can be employed. The measuring scale 1 is mounted on a rotatable drum 10. An additional scale 11 which is to be tested by comparison with the scale 1 is also mounted on the drum 10. A microscope 13 is mounted on the machine so as to be able to read the scale markings on the scales 1 and 11.

The scale 1 which is to be used as the master scale has its optical elements so adjusted so as to correctly position the images of the corresponding scale markings. The drum 10 is then rotated until a scale marking appears under the objective of the microscope 13. The graticule or cross-hairs of the microscope are then adjusted on a line of the scale marking should the scale marking comprise two parallel lines, as illustrated in the drawings. The drum is then rotated so that a corresponding scale marking of scale 11 appears beneath the microscope 13. Any deviation between the image of the scale marking of the scale 11 and the corresponding scale marking of the scale 1 can then be quickly ascertained through the microscope by comparison with the graticule thereof. The magnitude of this error can rapidly be determined from the magnitude of this deviation from the graticule. As a result, lengthy calculations for determining the deviation of the image of the scale 11 are eliminated.

Figure 5:
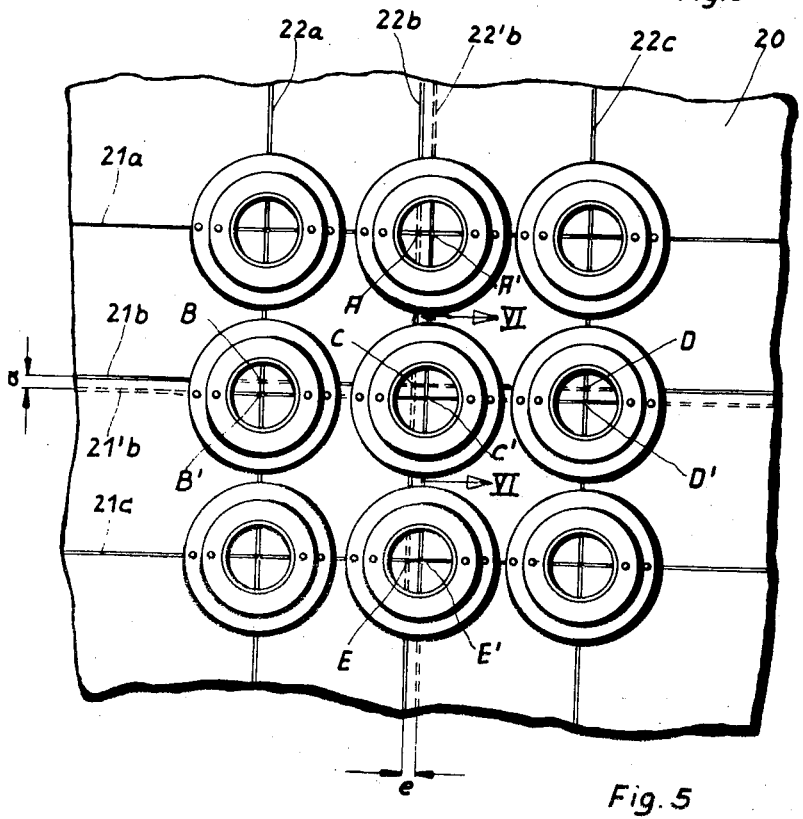
FIGURE 5 is a top plan view of the measuring scale of this invention as applied to scale grid lines which are at right angles to each other.

Proceeding next to FIGURES 5 and 6 there is shown another embodiment of this invention, showing the application thereof to a grid scale. There is illustrated a grid plate 20 which is provided with groups of parallel grid lines with the lines of one group being at right angles to the lines of another group. Each of the grid lines is formed of double strokes or linear markings. The grid lines 21a, 21b, 21c comprise one group of lines and grid lines 22a, 22b, 22c comprise the other group of grid lines.

Positioned above the grid plate 20 is a supporting frame 23 provided with a plurality of openings 23a. The openings 23a are positioned above each intersection of the grid lines as may be seen in FIGURE 5. In each opening 23a there is rotatably positioned a mounting frame 24. A glass plate 25 is provided in each mounting frame and is positioned at an angle with respect to the grid surface 20.

A second mounting frame 26 is rotatably mounted in the mounting frame 24. The mounting frame 26 also has positioned therein a glass plate 27 which is inclined at an angle with respect to the grid surface 20.

As illustrated in FIGURE 5, the grid lines 21b and 22b are misplaced from their accurate positions by the distance d and e. This error in positioning would most likely occur due to errors in the dividing machine during the forming of the grid lines on the grid surface. The correct position of these grid lines is at the positions 21b' and 22b' illustrated by the dashed lines. As a result, the grid intersection points A, B, C, D and E which are illustrated by dashed lines are incorrectly placed. The correct positions of these intersection points are at A', B', C', D' and E'. Since the mounting frames 24 and 26 are rotatable independently of each other, the rotation of these mountings through correct angles will always displace the images of the points A through E in such a manner that the images will be in the correct positions such as A' through E'.

Proceeding next to FIGURES 7 through 9 there is shown a modification of the optical element illustrated in FIGURES 5 and 6. This modified optical element comprises a mounting frame 30 which is rotatably mounted in the supporting frame 23. The mounting frame 30, however, has only a single glass plate 31 which is also inclined at an angle with respect to the surface of the grid 20. The flanges of the mounting frame 30 are provided with knife edges 32 which are positioned in corresponding bearings 33. As a result, the mounting frame 30 is pivotable about the axis X—X which is parallel to the surface of the grid 20. A pair of adjusting screws 34 and 35 is further provided so as to pivot the mounting frame through small angles.

With this modified optical element the intersections of the grid lines on the grid surface 20 can be viewed in their correct positions both by a pivoting or tilting of the mounting frame and by rotating the mounting frame in its supporting frame 23.

Thus it can be seen that the present invention provides an improved measuring scale which is susceptible to different applications and wherein the images of the scale markings can be viewed in their correct positions. As a result, even though the scale markings may have been inaccurately positioned during the manufacturing process, use of the measuring scale together with the optical elements of this invention will provide correct measurement results.

It will be understood that this invention is susceptible to modification in order to adapt it to different usages and conditions and, accordingly, it is desired to comprehend such modifications within this invention as may fall within the scope of the appended claims.

What is claimed as this invention is:

1. A measuring scale comprising a scale body having a longitudinally extending groove therein with a flat bottom surface, a plurality of scale marks on said bottom surface along predetermined intervals thereof, a supporting frame resiliently positioned in said groove between the side walls thereof and having a corresponding plurality of openings above said scale marks with one opening above each scale mark, and a corresponding plurality of glass plates inclined with respect to said scale surface and pivotally mounted in said openings for rotation about an axis perpendicular to the plane of said scale marks.

2. A measuring scale as claimed in claim 1 wherein said scale body has one of an X- and H-cross-section.

3. A measuring scale comprising a scale body having a groove therein with a flat bottom, a plurality of scale marks on said bottom surface along predetermined intervals thereof, a supporting frame resiliently positioned between the side walls of said groove, and a corresponding plurality of inclined glass plates pivotally mounted in said supporting frame and rotatable about an axis perpendicular to the plane of said scale marks above said scale marks.

4. A measuring scale comprising a scale body having a groove therein with a flat bottom, a plurality of scale marks on said bottom surface along predetermined intervals thereof, a supporting frame resiliently positioned between the side walls of said groove, a corresponding plurality of inclined glass plates pivotally mounted in said supporting frame and rotatable about an axis perpendicular to the plane of said scale marks above said scale marks, and a second glass plate extending across said groove and covering said supporting frame.

5. A measuring scale as claimed in claim 4 with said second glass plate also being inclined with respect to said scale surface.

6. A measuring scale comprising a scale body, a plurality of intersecting scale marks on a surface of said scale body, a corresponding plurality of pairs of glass plates with one pair of glass plates mounted above each of said intersecting scale marks and inclined with respect to said scale surface, said glass plates being rotatable independently of each other about an axis perpendicular to said scale surface.

7. A measuring scale comprising a scale body, a plurality of intersecting scale marks on a surface of said scale body, a corresponding plurality of glass plates with one of said glass plates pivotally mounted above each of said intersecting scale marks and pivotable about an axis parallel to said scale surface, said glass plates also being rotatable about an axis perpendicular to said scale surface, said glass plates being inclined at an angle with respect to said scale surface.

8. A measuring scale comprising a scale body, a first group of parallel scale grid lines and a second group of parallel scale grid lines with said second group of grid lines being perpendicular to the lines of said first group, said groups of scale grid lines intersecting to form a plurality of intersections, a supporting frame mounted above said scale surface, a corresponding plurality of pairs of glass plates with one pair of glass plates being positioned above each of said grid line intersections and inclined with respect to said scale surface, said glass plates being rotatable independently of each other about an axis perpendicular to said scale surface.

9. A measuring scale comprising a scale body, a first group of parallel scale grid lines and a second group of parallel scale grid lines with said second group of grid lines being perpendicular to the lines of said first group, said groups of scale grid lines intersecting to form a plurality of intersections, a supporting frame mounted above said scale surface, a corresponding plurality of glass plates with one glass plate pivotally mounted above each of said intersections of scale lines and pivotable about an axis parallel to said scale surface, said glass plates also being rotatable about an axis perpendicular to said scale surface, said glass plates being inclined at an angle with respect to said scale surface.

10. An apparatus for comparing the accuracy of scale marks on a measuring scale with a master scale, and comprising a rotatably mounted frame, a master scale body mounted on said frame with said body having a longitudinally extending groove therein having a flat bottom surface, a plurality of scale marks on said bottom surface along predetermined intervals thereof, a supporting frame resiliently positioned between the side walls of said groove, a corresponding plurality of inclined glass plates pivotally mounted in said supporting frame and rotatable about an axis perpendicular to the plane of said scale marks with one glass plate being positioned above each scale mark, a second scale similar to said master scale and mounted on said rotatable frame, and a microscope positioned above said frame to read corresponding scale marks on said scales upon rotation of said rotatable frame.

References Cited in the file of this patent
UNITED STATES PATENTS

| | | |
|---|---|---|
| 2,920,524 | Bartlett et al. | Jan. 12, 1960 |
| 2,953,962 | Argyle | Sept. 27, 1960 |